(12) United States Patent
Cotton

(10) Patent No.: US 6,704,484 B1
(45) Date of Patent: Mar. 9, 2004

(54) POLY-PLANAR OPTICAL DISPLAY IMAGING SYSTEM

(75) Inventor: Christopher T. Cotton, Honeoye Falls, NY (US)

(73) Assignee: Scram Technologies, Inc., Dunkirk, MD (US)

( * ) Notice: Subject to any disclaimer, the term of this patent is extended or adjusted under 35 U.S.C. 154(b) by 0 days.

(21) Appl. No.: 09/675,740

(22) Filed: Sep. 29, 2000

(51) Int. Cl.$^7$ ................................................ G02B 6/04
(52) U.S. Cl. ...................................................... 385/120
(58) Field of Search .............................. 385/120, 115, 385/116, 121, 742, 313, 475

(56) References Cited

U.S. PATENT DOCUMENTS

| | | | |
|---|---|---|---|
| 5,004,331 A | * | 4/1991 | Haseltine et al. ............ 359/728 |
| 5,381,502 A | * | 1/1995 | Veligdan ...................... 385/115 |
| 5,745,623 A | * | 4/1998 | Ohtomo et al. ................ 385/88 |
| 5,900,993 A | | 5/1999 | Betensky |
| 6,031,954 A | | 2/2000 | Higuchi |
| 6,048,105 A | * | 4/2000 | Ohtomo et al. ................ 385/88 |
| 6,075,597 A | | 6/2000 | Olshausen |
| 6,075,645 A | | 6/2000 | Hasushita |
| 6,122,106 A | | 9/2000 | Noyes et al. |
| 6,219,182 B1 | * | 4/2001 | Mckinley ...................... 359/407 |

\* cited by examiner

*Primary Examiner*—Jean F. Duverne
(74) *Attorney, Agent, or Firm*—Reed Smith LLP; William J. McNichol, Jr.; Matthew J. Esserman

(57) ABSTRACT

An optical system for projecting an image onto an input surface of a display to be observed by an observer at an output surface of the display is disclosed. The optical system comprises an image source, an imaging element, and a telescope. The optical system may also include a telecentric element and/or path-reduction prism. The display may comprise, for example, a plurality of stacked optical waveguides, each having a first end and a second end, wherein the input surface is defined by the plurality of first ends, and wherein the output surface is defined by the plurality of second ends. The optical system is preferably used when the tilt angle of the input surface is different than the tilt angle of the output surface. The optical system provides for a magnification to the input surface to be different than a magnification to the output surface.

39 Claims, 7 Drawing Sheets

POLY-PLANAR OPTICAL DISPLAY IMAGING SYSTEM

BACKGROUND OF THE INVENTION

1. Field of the Invention

The present invention relates generally to the field of display devices. In particular, the present invention relates to an optical system and method for projecting an image onto a display device. More specifically, the present invention relates to an optical system and method for projecting an image onto a poly-planar optical display (POD) device.

2. Description of the Background

In the field of image projection of a rectilinear object to a proportionately enlarged or reduced rectilinear image (as represented by conventional photographic enlargers and slide projectors), the entire image is projected typically upon a single plane (e.g., in the enlarger, to the photographic paper; and from the slide projector, to the screen). A more difficult task arises when an image must be projected into a display device having two separate image surfaces for the vertical and horizontal components of the image, each of which requires independent magnification and focus of the vertical and of the horizontal image components. The problem is further complicated when one of the image surfaces is tilted with respect to the projection axis, the tilt being so significant that conventional image focus will not be sustained along the full image surfaces. The two disparate image surfaces must be illuminated in such a manner that the vertical and the horizontal image components maintain independent focus along their respective tilted surfaces. Further, since projected images generally expand (or enlarge) over progressively greater projected field distances, tilted image surfaces are also subject to "keystoning", whereby one dimension (say, the horizontal "width") is enlarged progressively more as viewed from the "top" or the "bottom" of the image.

An example of a device which requires such image handling is represented in U.S. Pat. No. 5,381,502 entitled, "Flat or Curved Thin Optical Display Panel". FIG. 1 illustrates the type of panel construction described in the '502 patent. The panel comprises a stack of thin planar waveguide-like transparent lamina 111 each of typical thickness t. When the stack is cut at an acute angle S, each lamination exhibits a height h at the display surface such that h=t sec S. Thus, with S measuring typically about 70.degree., h is significantly larger than t. Also, the full display height H is larger than the base thickness T by the same factor, sec S.

The device of the '502 patent is called a "polyplanar optic display" (POD). The rightmost portion of the POD is represented primarily in FIG. 1 as an isometric view. The full width W is typically wider than its display height H. The portion which is detailed serves to describe the operation of the POD and is useful in understanding its relationship to the present invention. Each lamination (of thickness t) of the panel is a transparent sheet (glass or plastic) of nominal optical index of refraction $n_1$, separated by relatively thin coatings (cladding) having an index of refraction $n_2$, where $n_1 > n_2$. The cladding may be, for example, an opaque epoxy. Light entering the laminations at the base (input surface) is separated into sheets and is confined to its respective sheets by total internal reflection at the interfaces, i.e. at the cladding. The cladding serves to waveguide the image from one surface of the display to the other surface while absorbing scattered light that would otherwise reduce the contrast of the display. Thus, light focused at the base will retain "vertical" resolution elements of thickness t (in the "T"-direction) throughout its propagation "upward" to the display surface, where each thickness t is displayed as a corresponding resolvable height h. In the width W direction, however, there is no confinement of the input illumination, and each sheet propagates its respective slice (in the width direction) as would a continuous transparent medium. This requires that the horizontal image components be focused over varying distances corresponding to the tipped viewing surface (output surface). While the vertical component of the projected image must focus near the base, the horizontal information must focus near the sloping plane of the display surface (output surface); those components at the "bottom" of the display focusing close to the base, and those higher focusing at progressively greater distances to represent image elements approaching the top of the display. Also, while propagating through the lamina, the horizontal components expand progressively as an extension to the expanding illuminating field. Unless corrected, this generates keystoning, whereby (in this example) the top of the displayed image becomes wider than that at the bottom.

U.S. Pat. No. 6,012,816 entitled, "Optical Projection Apparatus and Method" describes an attempt to solve the aforementioned problems by providing image projection that can be used in conjunction with a POD type of display panel. However, the optical system of the '816 patent is difficult to adjust and/or fine-tune to obtain optimal image accuracy. Depending on how it is configured, the optical system may also be considered inefficient in projecting the image to a tilted input surface such that light corresponding to the image does not enter at least one of the waveguides at an entrance angle which is substantially parallel to a plane corresponding to one of the waveguides. When light does not enter the waveguides at an entrance angle which is substantially parallel to a plane corresponding to one of the waveguides, light loss may occur from the many discreet bounces that the light undergoes in the waveguides at the cladding. Additionally, the '816 patent is limited in design to optical systems requiring simple cylindrical lenses. The present invention also uses cylindrical lenses, but, in contrast to the '816 patent, uses cylindrical lenses in a more elegant fashion.

It is among the objects of the present invention to solve image handling problems of the type described above and also to provide image projection that can be used in conjunction with a POD type of display panel.

SUMMARY OF THE INVENTION

The present invention is directed to an optical system for projecting an image onto an input surface of a display to be observed by an observer at an output surface of the display. The optical system comprises an image source, an imaging element, and a telescope. The optical system may also include a telecentric element and/or path-reduction prism. The display may comprise, for example, a plurality of stacked optical waveguides, each having a first end and a second end, wherein the input surface is defined by the plurality of first ends, and wherein the output surface is defined by the plurality of second ends. The optical system is preferably used when the tilt angle of the input surface is different than the tilt angle of the output surface. The optical system provides for a magnification to the input surface to be different than a magnification to the output surface. In a preferred embodiment, the tilt angle of the input surface is non-perpendicular to a plane corresponding to one of the waveguides, and wherein the prism directs the image onto the input surface at an angle which is non-perpendicular to the input surface such that light corresponding to the image enters at least one of the waveguides at an entrance angle which is substantially parallel to the plane corresponding to one of the waveguides.

The present invention solves problems experienced in the prior art by providing an optical system having a reduced optical path that produces an accurate image on a tilted input surface of a display relative to the image path, and which does not suffer from improperly focused images and image distortions which yield false aspect ratios of the original image and inconsistent, linear point-to-point mapping of the original image to the displayed image. The present invention also retains the advantages which correspond to a stacked waveguide panel, such as improved contrast and minimized depth.

Those and other advantages and benefits of the present invention will become apparent from the detailed description of the invention provided below.

BRIEF DESCRIPTION OF THE SEVERAL VIEWS OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
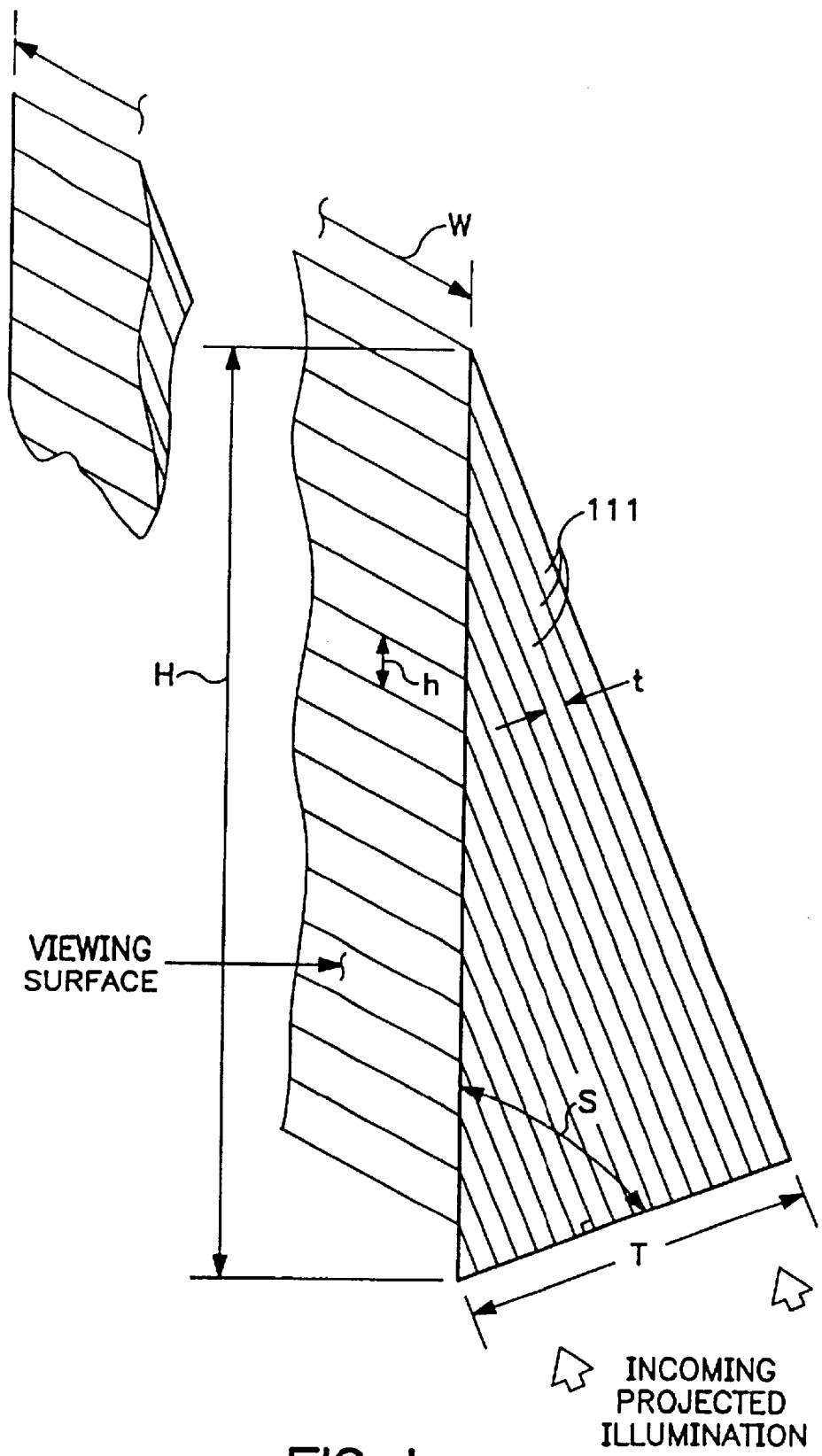
FIG. 1 is an isometric view, in partially broken away form, of a prior art POD display panel.
Figure 2:
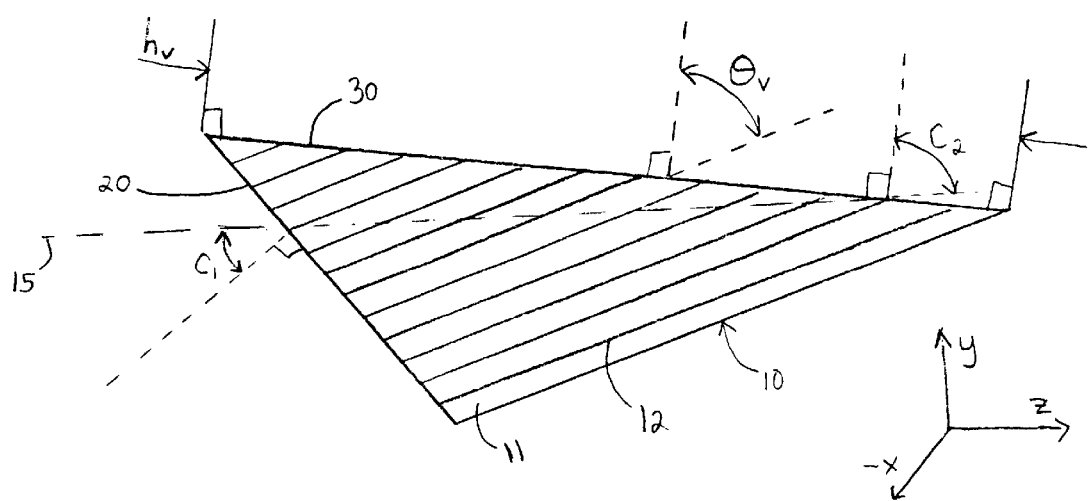
FIG. 2 is a side view cross sectional schematic of a POD, in accordance with a preferred embodiment of the present invention.
Figure 3:
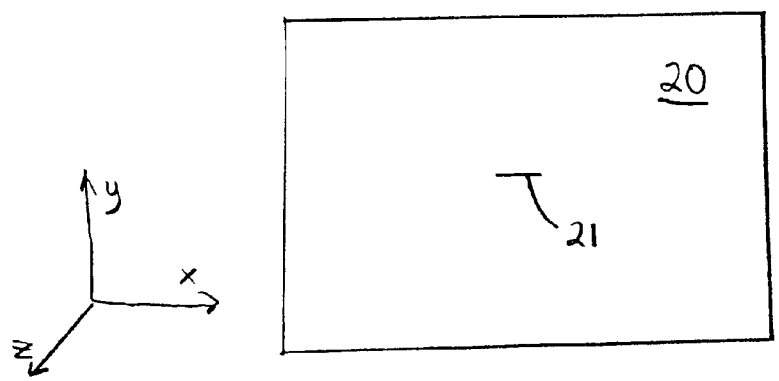
FIG. 3 is a schematic of the entire input face illustrating an exemplary point source imaged to a horizontal line at the input face without the use of waveguides, in accordance with a preferred embodiment of the present invention.
Figure 4:
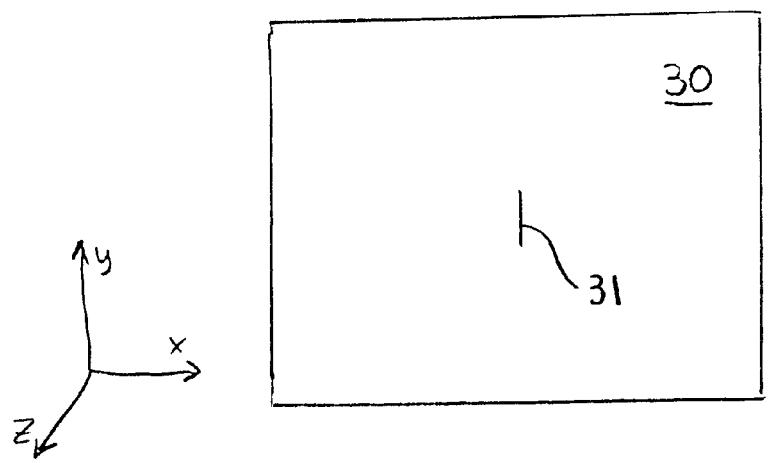
FIG. 4 is a schematic of the entire output face illustrating an exemplary point source imaged to a vertical line at the output face without the use of waveguides, in accordance with a preferred embodiment of the present invention.

FIG. 2 is a side view cross sectional schematic of a POD 10. The display 10 comprises a plurality of stacked optical waveguides 11, each having a first end and a second end, wherein the input surface 20 is defined by the plurality of first ends, and wherein the output surface 30 is defined by the plurality of second ends. Each waveguide 11 is surrounded by cladding 12 which guides the light traveling from the input surface to the output surface 30 by total internal reflection. The cladding is composed of a material which has a lower index of refraction than that of the material comprising the core of the waveguides. The material of the cladding is preferably black, and is more preferably, a black epoxy. The output surface 30 of the display 10 is cut such that a normal to the output surface 30 is at an angle ($\theta_v$) to the planes of the waveguides 11. $c_1$ (to be discussed below) represents an angle that a normal to the input surface 20 image makes with respect to the optical axis of the system 15. $c_2$ (to be discussed below) represents an angle that a normal to the output surface 30 image makes with respect to the optical axis of the system 15. The height ($h_v$) of the output surface 30 is therefore given by:

$$h_v = N(t_g + t_e)/\cos(\theta_v) \qquad (1)$$

where N is the number of waveguides, $t_g$ is the thickness of a planar glass sheet, and $t_e$ is the thickness of a layer of epoxy. For simplicity purposes, $t_g$ and $t_e$ are not illustrated in the figures. As shown in FIG. 2, the tilt angle of the input surface is different than the tilt angle of the output surface (i.e. while the input surface 20 may or may not be perpendicular to the planes of the waveguides). Therefore, the POD requires an image that has two separated, tilted image planes. Hence, the optical system must provide for a magnification to the input surface to be different than a magnification to the output surface. At the first image plane (input surface 20), the image is coupled into the horizontal waveguides of the POD. At input surface 20, the imaging system needs to form an image that is well-focused in the vertical direction. That is, the image of a point in the object (or original image) is imaged to a horizontal line with no vertical extent as illustrated in FIG. 3. The second image plane (output surface 30) is the viewing face of the POD. At the output surface 30, the light exits the POD and is observed by an observer. Because there is no confinement in the horizontal or width W direction as explained above with respect to FIG. 1, at the output surface 30, the imaging system needs to form an image that is well-focused in the horizontal direction. That is, the image of a point in the object (or original image) is imaged to a vertical line with no horizontal extent as illustrated in FIG. 4. The planar waveguides confine the image in the vertical direction and produce a sharp image in the vertical direction at the output surface 30. The waveguiding in the vertical direction and the horizontal focusing action of the imaging system combine to produce an image that appears to be well-focused in both directions (i.e. the image of a point in the object is effectively imaged to a point on the output surface 30). The magnifications at the two image planes must be different to produce an image with the correct aspect ratio at the output surface 30. The ratio of the magnification in the vertical direction ($m_v$) to the magnification in the horizontal ($m_h$) direction is given by:

$$m_v/m_h = \cos(\theta_v)\cos(c_1)/\cos(c_1 - c_2 + \theta_v) \qquad (2)$$

Figure 5:
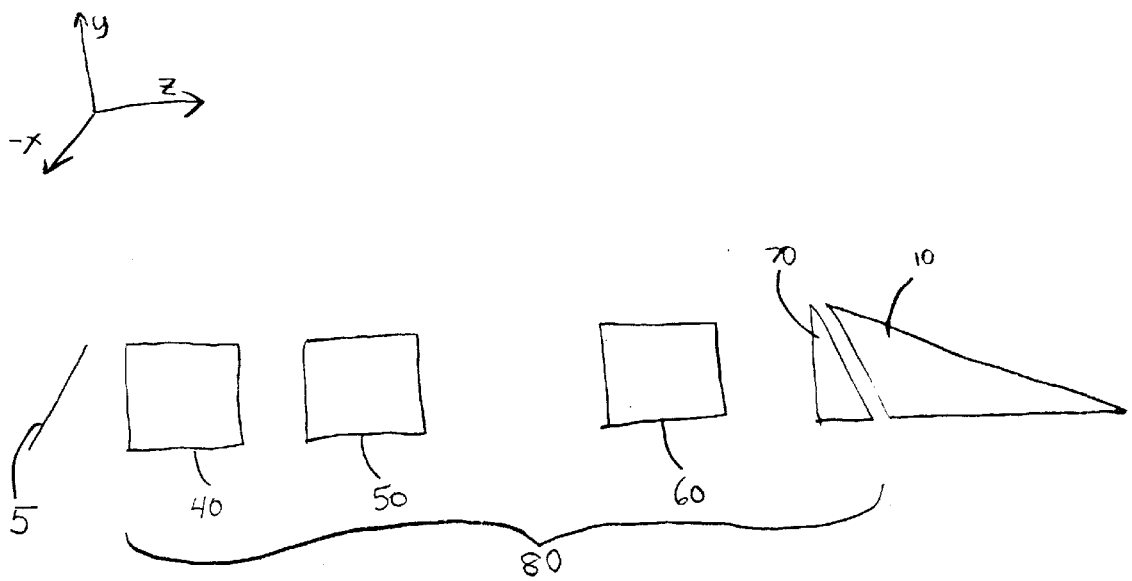
FIG. 5 is a side view schematic of an object to be imaged, optical system layout, and POD, in accordance with a preferred embodiment of the present invention.

FIG. 5 is a simplified side view schematic of an image source 5, an optical system 80 and a POD 10. The optical system 80 is used to project an image onto the input surface 20 of the display to be observed by an observer at the output surface 30 of the display. Although this disclosure describes the optical system in conjunction with a POD, i.e. having an input surface which is tilted with respect to the output surface, it is to be understood that the optical system of the present invention may be operable with other types of displays. As shown in the figure, the optical system 80 comprises an imaging element 40, a telescope 50, a telecentric element 60, and a path-reduction prism 70.

The image source 5 may be an illuminated object, e.g. an LCD or a DMD, or an emissive object, e.g. an LED array or a laser. The imaging element 40 may be a lens, mirror, or lens/mirror combination. The telescope 50 may be of Galilean or Keplerean type and may be composed of either refractive or reflective components or some combination of such. If the telescope 50 is anamorphic and Keplerean in composition (i.e. forming an intermediate astigmatic image), then the signs of $c_1$ and $c_2$ will be opposite from one another (leading to an input surface 20 slanted oppositely to that shown in FIG. 2), whereas if the telescope 50 is anamorphic and Galilean in composition (i.e. without forming an intermediate real image), then the signs of $c_1$ and $c_2$ will be the same.

In utilizing cylindrical elements, a type of anamorphic telescope is realized. The imaging element 40 is preferably rotationally symmetric when the telescope 50 is composed of cylindrical elements. In this preferred arrangement, the rotationally symmetric imaging element 40 may be comprised of 5 elements. The telescope 50 may be anamorphic and comprises a first and second lens group. The first lens group consists of one cylindrical element, while the second lens group consists of two cylindrical elements. These particular elements which comprise the rotationally symmetric imaging element 40 and telescope 50 enable a more accurate magnification of the image along both the vertical and horizontal directions at the input surface 20 and output surface 30, respectively. This precise dual magnification is particularly suited for color images which require more complex or additional imaging requirements. The result of using this optical system 80 leads to a significant improvement in imaging performance to that disclosed in the '816 patent which uses only two cylindrical lenses to accomplish the dual magnification. Since each of the cylindrical lenses in the '816 patent consists of one cylindrical component, the performance of the image is somewhat effective only for monochromatic images. Whereas, in contrast, the optical system 80 of the present invention is extremely effective in imaging of both monochromatic and multi-color images along the horizontal and vertical directions at the respective output surface 30 and input surface 20 of the display 10.

Alternatively, the telescope 50 is rotationally symmetric when the imaging element 40 is composed of cylindrical elements. In the embodiment wherein the telescope 50 is comprised of a plurality of cylindrical elements, the cylindrical elements are preferably symmetric about the y-z plane. The telecentric element 40 may be a lens, mirror, or lens/mirror combination and reduces or corrects keystone-type distortion of the image. The path-reduction prism 70 directs the image onto the input surface 20.

Figure 6:
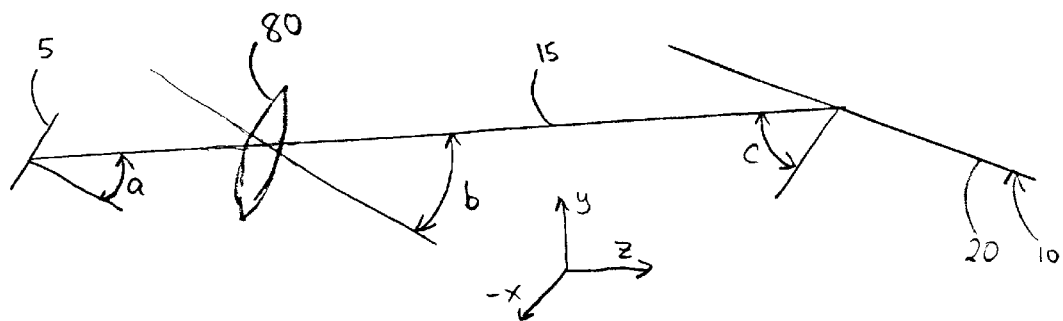
FIG. 6 is a side view schematic of an object to be imaged, optical system, and image surface used to illustrate the Scheimflug condition for the imaging of tilted planes for a prior art system and is used to further develop equations for the optical system of the present invention.

In the absence of the telecentric element 40, the action of the optical system 80 can be simply explained in terms of the Scheimflug rule, which (in air) can be expressed as:

$$m \tan(a-b)=\tan(c+b) \qquad (3)$$

where m is the magnification ratio from the object (or original image) to the displayed image, a is the angle that the normal to the object makes with respect to the optical axis of the system 15. The optical axis of the system 15 is defined as a line drawn between the center of the object 5 and the center of the displayed image (illustrated on the right side of FIG. 6), b is the angle between the optical axis of the optical system 80 and the optical axis of the system 15, and c is the angle that the normal to the image makes with respect to the optical axis of the system 15. The angles a, b, and c are required to all be in the same plane (y-z plane). If considering the case of the POD wherein the tilt angle of the input surface 20 and the tilt angle of the output surface 30 are different, it is clear that the magnifications to the two image planes must also be different. For simplicity purposes, consider the system where the angle b is zero (b=0) and the index of refraction of the POD is equal to 1. In this particular case, equation (3) can be easily written for the vertical and horizontal directions and becomes:

$$m_v \tan(a)=\tan(c_1 \text{ for input surface } 20) \qquad (4a)$$

$$m_h \tan(a)=\tan(c_2 \text{ for output surface } 30) \qquad (4b)$$

In combining equations (4a) and (4b) with equation (2) (noting that, for this case, $\theta_v$ is identical to $c_2$), we find that:

$$c_1=\text{atan}(\sin(\theta_v)) \qquad (5)$$

Using the above equations combined with information about the required object and image size, the path length and the required value for $\theta_v$, we can find the required vertical magnification, horizontal magnification, tilt angle for the object, and tilt angle for the input surface 20. Once these parameters have been defined, the imaging element 40 can be defined to give the correct horizontal magnification and the telescope 50 can be defined to alter the vertical magnification.

The above equations can also be converted to include the effects of reduced thickness on the Scheimflug rule. Clearly, this system will not operate if the POD material has a refractive index equal to air. With this, POD comprised of glass must meet the requirement that the light incident on the input surface 20 must be incident at an angle such that when it enters the planar sheets, the refraction angle is close to being parallel to the sheets. This requirement creates a relationship between $c_1$, $c_2$, and $\theta_v$ that can be expressed as:

$$\theta_v=c_2-c_1+\text{asin}(\sin(c_1)/n) \qquad (6a)$$

where n is the index of refraction of the POD material. The insertion of a material with a refractive index greater than 1 between input surface 20 and output surface 30 also changes the requirement for the horizontal magnification (formerly equation (4b)) to:

$$m_h \tan(a)=\tan(c_1+\text{atan}(\tan(c_2-c_1)/n)) \qquad (6b)$$

Equations (6a) and (6b) can be combined with equation (2) to determine the required system parameters. From these equations, it is apparent that, in the absence of the path-reduction prism 70, the planes of the waveguides are preferably non-parallel with respect to the optical axis of the system 15.

In a preferred embodiment, the path-reduction prism 70 is used when the input surface 20 is non-perpendicular to the optical axis of the system 15. The path-reduction prism 70 is used to meet the requirement that the light incident on the input surface 20 must be incident at an angle such that when it enters the planar sheets, the refraction angle is close to being parallel to the sheets. This requirement is met by effectively immersing the input surface 20 in glass. Optionally, the path-reduction prism is placed in proximity to or affixed to (e.g. cemented) the bottom of the POD. When the input face of the path-reduction prism is perpendicular to the optical axis of the system 15 and is made of a material that is close to the same refractive index as the glass of the POD, then the refraction of the light at the interface between the path-reduction prism and the POD is negligible, or even eliminated. Therefore, the planar sheets of the POD can be parallel to the optical axis of the system 15. A second advantage of using the path-reduction prism is the reduction of the effective tilt of the input surface 20 through the effect of reduced thickness. The occurrence of reduced thickness is well known to those of ordinary skill in the art. The glass of the POD also reduces or eliminates the effective tilt of the output surface 30 through the same effect.

In a preferred embodiment, the tilt angle of the input surface 20 is non-perpendicular to a plane corresponding to one of the waveguides 11 while the path-reduction prism 70 directs the image onto the input surface 20 at an angle which is non-perpendicular to the input surface 20 such that light corresponding to the image enters at least one of the waveguides 11 at an entrance angle which is substantially parallel to the plane corresponding to one of the waveguides 11.

For a system that utilizes a path-reduction prism, equations (4a) and (4b) can be rewritten as:

$$m_v \tan(a) = \tan(c_1/n) \tag{7a}$$

$$m_h \tan(a) = \tan(c_2/n) \tag{7b}$$

where n is the refractive index of the POD and the path-reduction prism. Equation (5) then becomes:

$$c_1 = n \operatorname{atan}(\tan(\theta_v/n)\cos(\theta_v)) \tag{8}$$

Once again, the above equations can be combined with information about the required object and image size and the required value for $\theta_v$. We can then find the required vertical magnification, horizontal magnification, tilt angle for the object, and tilt angle for the input surface 20.

To correct for trapezoidal image distortion (i.e. keystone distortion), the optical system of the present invention may optionally include a telecentric element. Trapezoidal image distortion typically exists in tilted imaging systems. The action of the telecentric element is to cause the image at the input surface 20 and output surface 30 to be telecentric. A telecentric image does not change magnification when the image plane location is shifted along the optical axis of the system 15 (the z-axis).

In contrast to the '816 patent, the present invention requires a telescope 50, whereas the '816 patent does not. The present invention also may use a path-reduction prism while the '816 patent does not. In addition to the many advantages in using the optical system 80 of the present invention as described above, another significant advantage in using the above components within the optical system 80 is such that the above equations, as expressed in their simplest form, may be used to establish a system with desirable properties/values.

Figure 7:
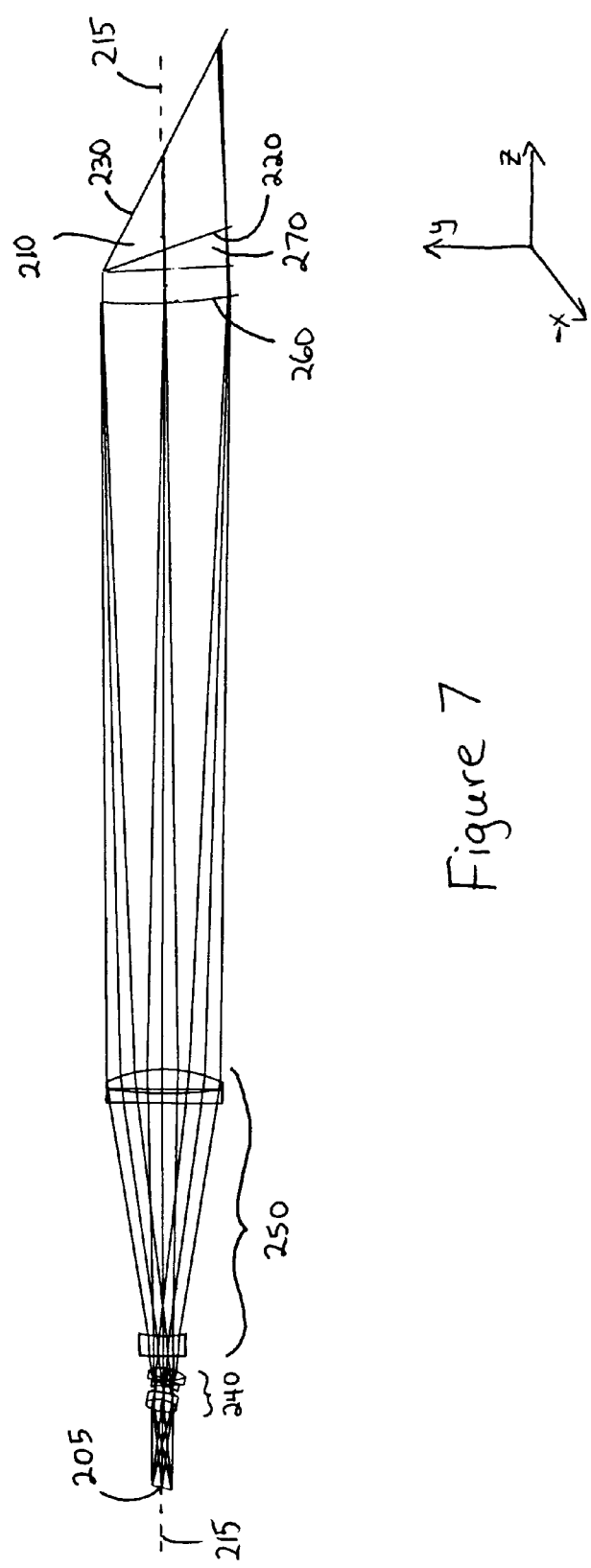
FIG. 7 is a side view schematic of an object to be imaged, optical system, and POD, in accordance with a preferred embodiment (as shown in Table 1) of the present invention.
Figure 8:
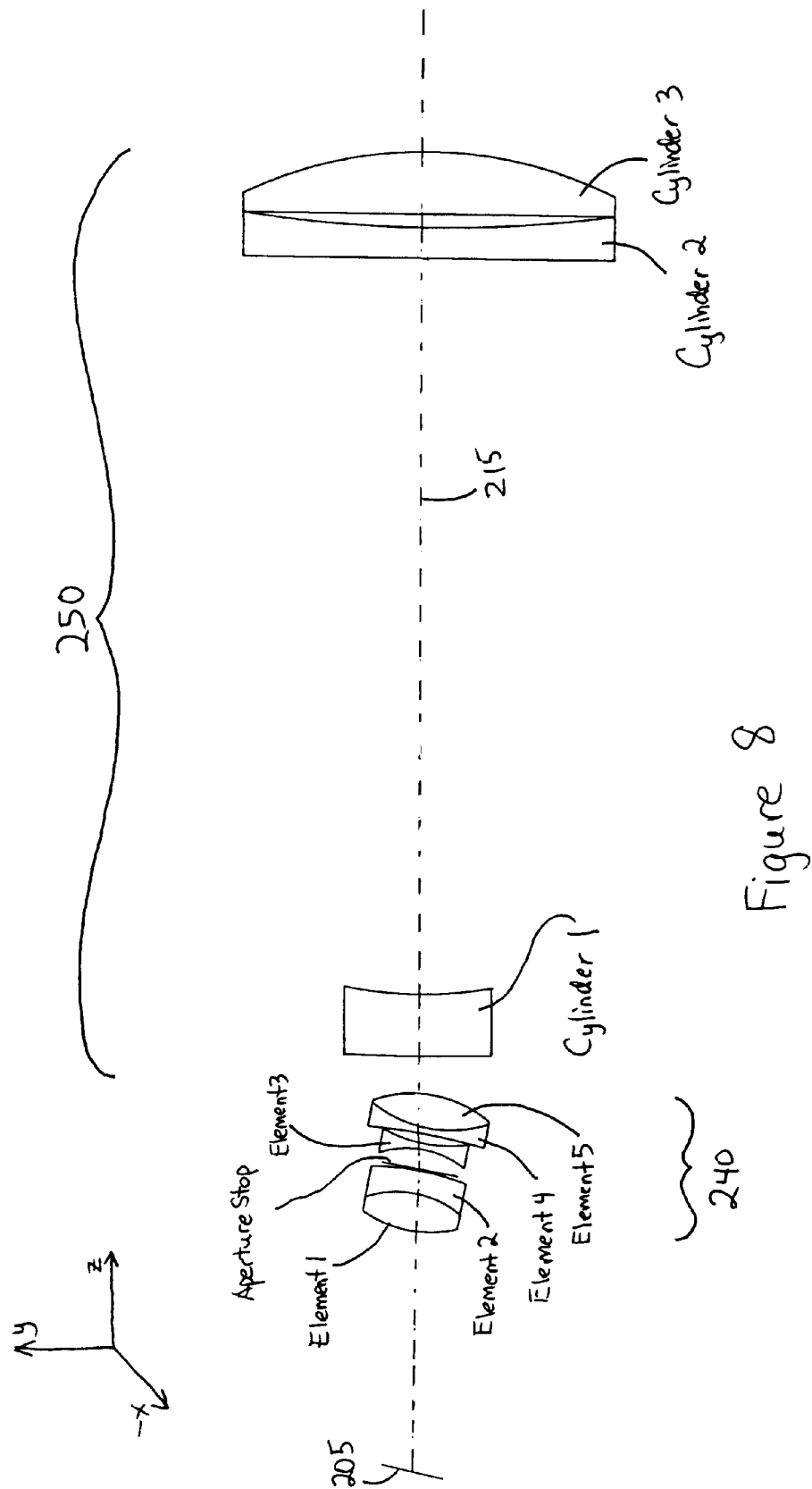
FIG. 8 is an enlarged view of the object to be imaged, rotationally symmetric imaging lens, and telescope in the exemplary system of FIG. 7.
Figure 9:
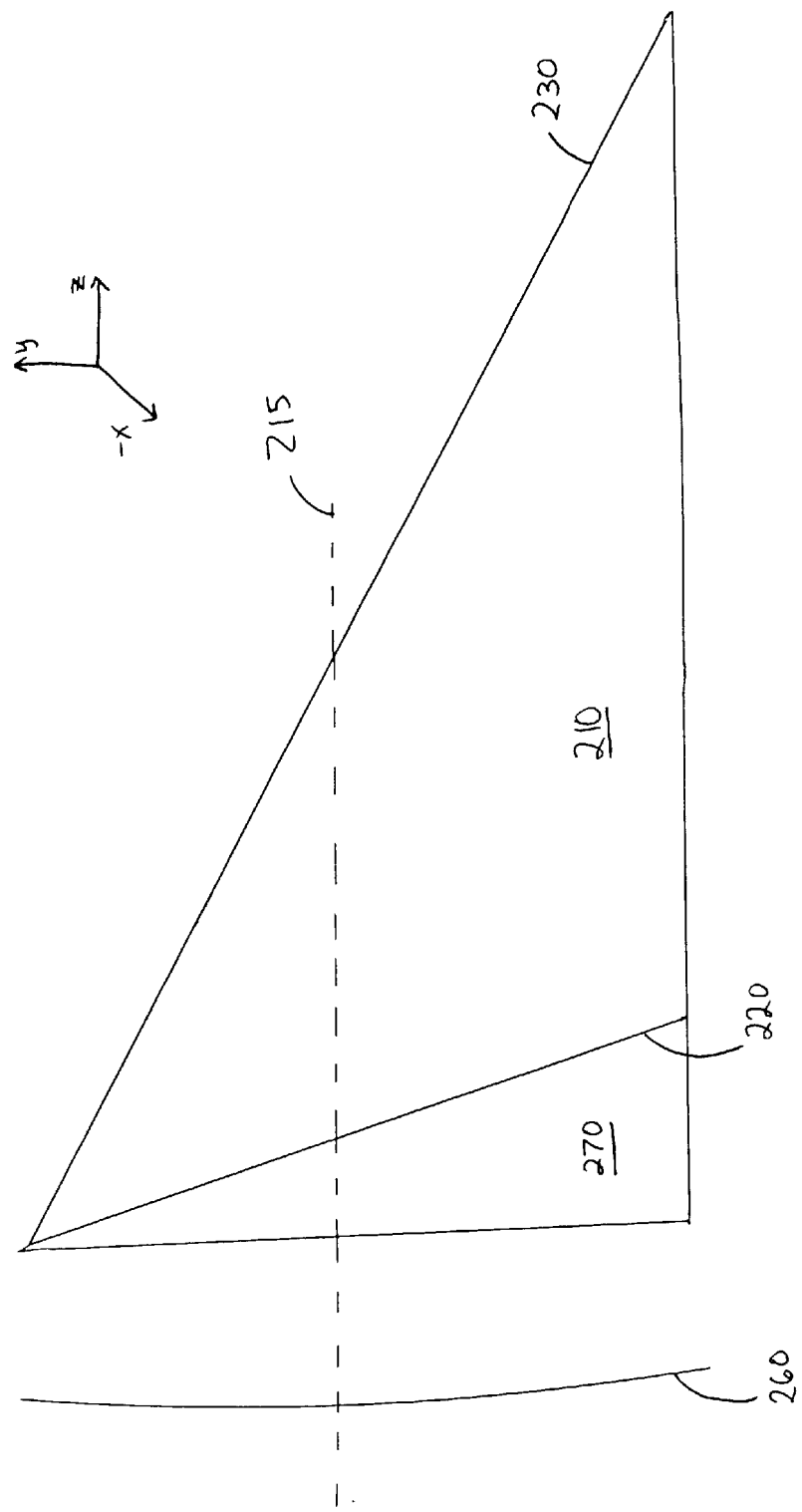
FIG. 9 is an enlarged view of the telecentric lens, path-reduction prism, and POD in the exemplary system of FIG. 7.

In a preferred embodiment (as shown in Table 1 and as illustrated in FIGS. 7–9), the units are millimeters and the design wavelengths are 486 nm, 587 nm and 656 nm. The tilts shown in Table 1 are all about the x-axis and are positive for clockwise rotations. The action of the tilts is for changing the direction of the local optical axis. The object 205 in the exemplary system is a rectangle that is 13.6 mm (in the x-direction) x 10.2 mm (in the y-direction). The object 205 is tilted at an angle of 12.58 degrees. Elements 1 through 5 define a rotationally symmetric imaging lens 240 that is tilted at an angle of 10.14 degrees about a pivot point. Surfaces 2 and 12 are coincident and constitute the pivot point for rotation of the rotationally symmetric imaging lens 240. The surfaces of cylinders 1, 2, and 3 each have curvatures in the y-axis only, as are each designated by the "Y" immediately following the value of the radius of curvature of the surface. Cylinder 1 constitutes the negative-first element of the cylindrical Galilean telescope 250 and cylinders 2 and 3 together constitute the positive-second element of the telescope 250. The telecentric lens 260 is tilted at an angle of –3.5 degrees, as is the input surface of the path-reduction prism 270. The path-reduction prism 270 has an angle of –16.5 degrees and is cemented to both the telecentric lens 260 and the input surface 220 of the POD 210. The POD 210 has an angle of –43.5 degrees between the input surface 220 and output surface 230. In this system, the waveguides that comprise the POD 210 are not parallel to the optical axis of the system 215. The angle between the planes of the waveguides and the optical axis of the system 215 is 2.3 degrees. Note that the "Aperture" column in Table 1 represents a rectangular (with x and y dimensions, respectively) or circular (with diameter) shape.

TABLE 1

| # | Surface | Tilt about x-axis | Radius (mm) | Thickness (mm) | Glass nd | Glass vd | Aperture (mm) (x) × (y) |
|---|---|---|---|---|---|---|---|
| 0 | OBJECT | | Infinity | 0 | | | 13.6 × 10.2 |
| 1 | | −12.58 DEG | — | 45.16 | | | — |
| 2 | PIVOT POINT | 10.14 DEG | — | −6.64 | | | — |
| 3 | ELEMENT 1 | | 19.29 | 5.92 | 1.651130 | 55.89 | DIAMETER 15.5 |
| 4 | ELEMENT 2 | | −16.05 | 3.71 | 1.620040 | 36.37 | DIAMETER 15.5 |
| 5 | APERTURE STOP | | −44.51 | 0.26 | | | DIAMETER 8.0 |
| 6 | | | Infinity | 3.24 | | | DIAMETER 12.5 |
| 7 | ELEMENT 3 | | −14.35 | 1 | 1.603420 | 38.03 | DIAMETER 14 |
| 8 | | | 21.58 | 1.56 | | | DIAMETER 14 |
| 9 | ELEMENT 4 | | −96.32 | 1 | 1.487490 | 70.41 | DIAMETER 19 |

TABLE 1-continued

| # | Surface | Tilt about x-axis | Radius (mm) | Thickness (mm) | Glass nd | Glass vd | Aperture (mm) (x) × (y) |
|---|---|---|---|---|---|---|---|
| 10 | ELEMENT 5 | | 19.79 | 5.39 | 1.651130 | 55.89 | DIAMETER 19 |
| 11 | | | −18.95 | −15.44 | | | DIAMETER |
| 12 | PIVOT POINT | TILT −10.14 | — | 21.53 | | | — |
| 13 | CYLINDER 1 | | 381.3 Y | 10 | 1.458464 | 67.82 | 25.4 × 25.4 |
| 14 | | | 63.6 Y | 119.44 | | | 25.4 × 25.4 |
| 15 | CYLINDER 2 | | Infinity | 5 | 1.755200 | 27.58 | 60 × 60 |
| 16 | | | 205.65Y | 2.19 | | | 60 × 60 |
| 17 | CYLINDER 3 | | Infinity | 10 | 1.589130 | 61.27 | 60 × 60 |
| 18 | | | −69.22Y | 394.28 | | | 60 × 60 |
| 19 | | TILT −3.5 DEG | — | 0 | | | — |
| 20 | TELECENTRIC LENS | | 300 | 17 | 1.607380 | 56.65 | 182 × 72 |
| 21 | PATH REDUCTION PRISM | | Infinity | 0 | 1.516800 | 64.17 | 182 × 72 |
| 22 | | TILT 3.5 DEG | — | 11 | 1.516800 | 64.17 | — |
| 23 | | TILT −20 DEG | — | 0 | 1.516800 | 64.17 | — |
| 24 | INPUT SURFACE | | Infinity | 0 | 1.516800 | 64.17 | 182 × 73 |
| 25 | | TILT 20 DEG | — | 57 | 1.516800 | 64.17 | — |
| 26 | | TILT −63.5 DEG | — | 0 | 1.516800 | 64.17 | — |
| 27 | OUTPUT SURFACE | | Infinity | | 1.516800 | 64.17 | 182 × 153.5 |

Those of ordinary skill in the art will recognize that many modifications and variations of the present invention may be implemented. For example, although the optical system 80 is described as comprising an imaging element 40, a telescope 50, a telecentric element 60, and a path-reduction prism 70, the optical system 80 of the invention may alternatively not utilize the telecentric element 60 and/or path-reduction prism 70. Also, the optical axis of the optical system 80 may or may not be parallel to the optical axis of the system 15. Moreover, the input face of the path-reduction prism may not be perpendicular to the optical axis of the system 15. Further, the refractive index of the path-reduction prism may not be exactly identical to the refractive index of the POD material. Even further, tilting of the cylindrical lenses within the telescope 50 about a horizontal axis (x-axis) may be performed. Tilting of other element(s), e.g. the image source 5, element(s) within the optical system 80, or the POD itself may alternatively be performed for fine-tuning purposes. The foregoing description and the following claims are intended to cover all such modifications and variations.

What is claimed is:

1. An optical system for projecting an image onto an input surface of a display to be observed by an observer at an output surface of the display, the optical system comprising:
   an image source;
   an imaging element; and
   a telescope;
   wherein the image from the image source is transmitted through the imaging element and the telescope for projection onto the input surface of the display to be observed by the observer at the output surface of the display.

2. The optical system of claim 1, wherein one of the imaging element and telescope is rotationally symmetric and the other is anamorphic.

3. The optical system of claim 2, wherein the imaging element is rotationally symmetric and the telescope is cylindrical.

4. The optical system of claim 2, wherein the imaging element is cylindrical and the telescope is rotationally symmetric.

5. The optical system of claim 2, wherein the image source, imaging element, and telescope are respectively positioned within a path of the projected image.

6. The optical system of claim 2 further comprising a path-reduction prism to direct the image onto the input surface.

7. The optical system of claim 6, wherein the image source, imaging element, telescope, and prism are respectively positioned within a path of the projected image.

8. The optical system of claim 6 further comprising a telecentric element for reducing keystone-type distortion of the image.

9. The optical system of claim 8, wherein the telecentric element is positioned between the telescope and prism within a path of the projected image.

10. The optical system of claim 6, wherein the prism is immediately adjacent the input surface.

11. The optical system of claim 6, wherein the display comprises a plurality of stacked optical waveguides, each having a first end and a second end, wherein the input surface is defined by the plurality of first ends, and wherein the output surface is defined by the plurality of second ends.

12. The optical system of claim 11, wherein a refractive index of the prism is substantially equal to a refractive index of the waveguides.

13. The optical system of claim 6, wherein an input face of the prism is substantially perpendicular to a path of the projected image.

14. The optical system of claim 2 further comprising a telecentric element for reducing keystone-type distortion of the image.

15. The optical system of claim 14, wherein the image source, imaging element, telescope, and telecentric element are respectively positioned within a path of the projected image.

16. The optical system of claim 8, wherein the image source, imaging element, telescope, telecentric element, and prism are respectively positioned within a path of the projected image.

17. The optical system of claim 2, wherein the telescope is of Galilean type.

18. The optical system of claim 2, wherein the telescope is of Keplerean type.

19. The optical system of claim 2, wherein the telescope comprises a plurality of cylindrical elements.

20. The optical system of claim 19, wherein the cylindrical elements are symmetric about a given plane.

21. The optical system of claim 20, wherein the given plane is the y-z plane.

22. The optical system of claim 20, wherein the cylindrical elements are tilted with respect to an axis in the x direction.

23. The optical system of claim 2, wherein the tilt angle of the input surface is different than the tilt angle of the output surface, and wherein the optical system provides for a magnification to the input surface to be different than a magnification to the output surface.

24. The optical system of claim 2, wherein the imaging element is a lens.

25. The optical system of claim 2, wherein the imaging element is a mirror.

26. The optical system of claim 2, wherein the imaging element is a combination of a lens and a mirror.

27. The optical system of claim 8, wherein the telecentric element is a lens.

28. The optical system of claim 8, wherein the telecentric element is a mirror.

29. The optical system of claim 8, wherein the telecentric element is a combination of a lens and a mirror.

30. The optical system of claim 2, wherein the tilt angle of the input surface is different than the tilt angle of the output surface.

31. The optical system of claim 1, wherein both the telescope and the imaging element control a magnification to the input surface, and wherein the imaging element further controls a magnification to the output surface.

32. The optical system of claim 2, wherein both the telescope and the imaging element control a magnification to the input surface, and wherein the imaging element further controls a magnification to the output surface.

33. The optical system of claim 30, wherein both the telescope and the imaging element control a magnification to the input surface, and wherein the imaging element further controls a magnification to the output surface.

34. The optical system of claim 1, wherein the optical system projects the image i n one dimension differently than in another dimension.

35. The optical system of claim 2, wherein the optical system projects the image in one dimension differently than in another dimension.

36. The optical system of claim 30, wherein the optical system projects the image on the input surface differently than on the output surface.

37. The optical system of claim 1, wherein the tilt angle of the input surface is different than the tilt angle of the output surface, wherein the optical system projects the image on the input surface differently than on the output surface.

38. An optical system for projecting an image onto an input surface of a display to be observed by an observer at an output surface of the display, the optical system comprising:

an image source;

an imaging element;

a telescope; and a path-reduction prism to direct the image onto the input surface;

wherein one of the imaging element and telescope is rotationally symmetric and the other is anamorphic; and wherein the display comprises a plurality of stacked optical waveguides, each having a first end and a second end, wherein the input surface is defined by the plurality of first ends, and wherein the output surface is defined by the plurality of second ends, wherein the tilt angle of the input surface is non-perpendicular to a plane corresponding to one of the waveguides, and wherein the prism directs the image onto the input surface at an angle which is non-perpendicular to the input surface such that light corresponding to the image enters at least one of the waveguides at an entrance angle which is substantially parallel to the plane corresponding to one of the waveguides.

39. An optical system for projecting an image onto an input surface of a display to be observed by an observer at an output surface of the display, the optical system comprising:

an image source;

an imaging element; and a telescope;

wherein one of the imaging element and telescope is rotationally symmetric and the other is anamorphic; and wherein the tilt angle of the input surface is different than the tilt angle of the output surface, wherein the optical system provides for a magnification to the input surface to be different than a magnification to the output surface, wherein both the telescope and the imaging element control the magnification to the input surface, and wherein the imaging element further controls the magnification to the output surface.

* * * * *